(12) United States Patent
Sumi et al.

(10) Patent No.: US 11,999,081 B2
(45) Date of Patent: Jun. 4, 2024

(54) METHOD FOR PRODUCING PELLETS, METHOD FOR PRODUCING RESIN MOLDED ARTICLE, AND PELLETS

(71) Applicant: TBM CO., LTD., Tokyo (JP)

(72) Inventors: Yuichiro Sumi, Tokyo (JP); Shigeki Kuroki, Tokyo (JP)

(73) Assignee: TBM CO., LTD., Tokyo (JP)

( * ) Notice: Subject to any disclaimer, the term of this patent is extended or adjusted under 35 U.S.C. 154(b) by 1048 days.

(21) Appl. No.: 16/344,175

(22) PCT Filed: Oct. 18, 2017

(86) PCT No.: PCT/JP2017/037640
§ 371 (c)(1),
(2) Date: Apr. 23, 2019

(87) PCT Pub. No.: WO2018/092494
PCT Pub. Date: May 24, 2018

(65) Prior Publication Data
US 2019/0283275 A1    Sep. 19, 2019

(30) Foreign Application Priority Data
Nov. 17, 2016  (JP) ................................. 2016-224439

(51) Int. Cl.
| B29B 7/48 | (2006.01) |
| B29B 9/06 | (2006.01) |
| C08K 3/26 | (2006.01) |
| C08L 23/00 | (2006.01) |
| C08L 23/02 | (2006.01) |

(52) U.S. Cl.
CPC ................ B29B 7/48 (2013.01); B29B 9/06 (2013.01); C08K 3/26 (2013.01); C08L 23/00 (2013.01); C08L 23/02 (2013.01)

(58) Field of Classification Search
CPC ............ B29B 9/06; B29B 7/002; B29B 7/007
See application file for complete search history.

(56) References Cited

U.S. PATENT DOCUMENTS

| 9,382,356 | B2 * | 7/2016 | Tohi ..................... C08L 23/142 |
| 9,492,964 | B2 * | 11/2016 | Sumi ..................... B29C 55/005 |
| 2004/0120217 | A1 * | 6/2004 | Sentmanat ................ B29B 7/90 |
| | | | 366/267 |
| 2008/0220193 | A1 | 9/2008 | Tohi et al. |
| 2011/0071252 | A1 * | 3/2011 | Prince ..................... B29B 7/244 |
| | | | 425/169 |
| 2014/0100328 | A1 * | 4/2014 | Sumi .................... B29C 48/0018 |
| | | | 264/173.1 |
| 2015/0353695 | A1 * | 12/2015 | Sumi ....................... C08K 3/26 |
| | | | 524/427 |
| 2017/0217078 | A1 * | 8/2017 | Sumi ......................... C08J 5/18 |
| 2019/0144650 | A1 * | 5/2019 | Kometani ............... C08K 5/20 |
| | | | 525/60 |
| 2019/0210250 | A1 * | 7/2019 | Park ....................... D01D 5/12 |

FOREIGN PATENT DOCUMENTS

| CA | 2438243 C * | 6/2010 | ........... B29C 55/005 |
| EP | 2716696 A1 | 4/2014 | |
| EP | 1900758 B1 | 3/2016 | |
| EP | 1900758 B9 | 3/2016 | |
| EP | 3202551 A1 | 8/2017 | |
| JP | 2013010931 A | 1/2013 | |
| JP | 2014231584 A * | 12/2014 | |
| JP | 2014231584 A | 12/2014 | |
| WO | 2006123759 A1 | 11/2006 | |
| WO | 2016051612 A1 | 8/2017 | |
| WO | 2018092481 A1 | 5/2018 | |

OTHER PUBLICATIONS

International Search Report corresponding to Application No. PCT/JP2017/037640; Dated Dec. 19, 2017.
EPO Extended Search Report for corresponding EP Application No. 17870897.0; dated Jun. 12, 2020.

\* cited by examiner

*Primary Examiner* — Seyed Masoud Malekzadeh
(74) *Attorney, Agent, or Firm* — CANTOR COLBURN LLP

(57) ABSTRACT

Provided are a method for producing pellets that are easy to be uniformly molded at the time of using the pellet for molding even when the pellets include a large amount of inorganic substance particles, the pellets, and a method for molding a resin molded article. The method for producing pellets according to the present invention includes a method for producing pellets formed from a resin composition including a crystalline macromolecule and an inorganic fine powder or organic fine powder in a mass ratio of 50:50 to 20:80, the method including the step of kneading the crystalline macromolecule and the inorganic fine powder or the organic fine powder so that the microcrystalline size of the crystalline macromolecule is 190 Å or smaller. The pellets according to the present invention are pellets formed from a resin composition including a crystalline macromolecule having a microcrystalline size of 190 Å or smaller, and inorganic substance particles in a mass ratio of 50:50 to 20:80.

5 Claims, No Drawings

METHOD FOR PRODUCING PELLETS, METHOD FOR PRODUCING RESIN MOLDED ARTICLE, AND PELLETS

CROSS REFERENCE TO RELATED APPLICATIONS

This is the U.S. national stage of International Application No. PCT/JP2017/037640, filed on Oct. 18, 2017. Priority under 35 U.S.C. § 119(a) and 35 U.S.C. § 365(b) is claimed from Japanese Application No. 2016-224439, filed on Nov. 17, 2016, the disclosures all of which are also incorporated herein by reference.

FIELD

The present invention relates to a method for producing pellets, a method for producing a resin molded article, and pellets.

BACKGROUND

Conventionally, methods of forming a resin composition into pellets so as to facilitate processing and thereafter molding a resin molded article have been frequently employed as methods for producing the resin molded article.

For example, Patent Literature 1 has disclosed a method for producing a resin molded article including the step of extrusion molding pellets including a thermoplastic resin and inorganic fine powder in an amount of 60% by weight to 82% by weight from a T die to form a sheet-like product.

CITATION LIST

Patent Literature

Patent Literature 1: Japanese Patent Application Laid-open No. 2013-10931

SUMMARY

Technical Problem

The pellets including the inorganic fine powder in a high concentration as described in Patent Literature 1, however, cause a problem of difficulty in uniform molding depending on the kind of the thermoplastic resin when the sheet that is produced using the pellets is subjected to molding such as stretching.

The present invention has been made to solve the above problem and an object of the present invention is to provide a method for producing pellets that are easy to be uniformly molded at the time of using the pellet for molding even when the pellets include a large amount of the inorganic fine powder, pellets, and a method for molding a resin molded article.

Solution to Problem

The inventors of the present invention have found that uniform stretching is possible even when the pellets include a large amount of the inorganic substance particles by carefully controlling the microcrystalline size of a crystalline macromolecule in the pellets that include a large amount of the inorganic fine powder and have completed the present invention. More specifically, the present invention aims to provide the followings.

(1) A method for producing pellets formed from a resin composition including a crystalline macromolecule and inorganic fine powder or organic fine powder in a mass ratio of 50:50 to 20:80, the method including the step of:
  kneading the crystalline macromolecule and the inorganic substance particles so that the microcrystalline size of the crystalline macromolecule is 190 Å or smaller.

(2) The method according to (1), in which the crystalline macromolecule includes a polypropylene resin or a polyethylene resin.

(3) The method according to (1) or (2), in which the inorganic fine powder includes calcium carbonate particles.

(4) The method according to any one of (1) to (3), in which the pellets are molded by kneading at a temperature equal to or higher than a temperature at which the microcrystalline size of the crystalline macromolecule is 190 Å or smaller.

5) A method for producing a resin molded article, the method including the steps of:
  producing the pellets by the method according to any one of (1) to (4), and
  molding the pellets into a resin molded article.

(6) Pellets formed from a resin composition including a crystalline macromolecule having a microcrystalline size of 190 Å or smaller, and inorganic fine powder or organic fine powder in a mass ratio of 50:50 to 20:80.

Advantageous Effects of Invention

According to the present invention, although the pellets include the inorganic fine powder or organic fine powder in a large amount, the molded article can be close to uniform when the pellets are used for molding.

DESCRIPTION OF EMBODIMENTS

Hereinafter, the embodiments of the present invention will be described. The present invention, however, is not particularly limited to these embodiments and can be appropriately modified.

Method for Producing Pellets

The present invention includes a method for producing pellets formed from a resin composition including a crystalline macromolecule and inorganic fine powder or organic fine powder in a mass ratio of 50:50 to 20:80, the method including the step of kneading the crystalline macromolecule and the inorganic fine powder or the organic fine powder so that the microcrystalline size of the crystalline macromolecule is 190 Å or smaller. The pellets including the inorganic fine power or the organic fine powder in a large amount have difficulty in uniform molding when the pellets are molded. The inventors of the present invention, however, have found that, although the pellets produced by such a method include the inorganic fine powder or organic fine powder in a large amount, a molded article tends to be uniform when the molded article is molded. For example, according to the present invention, a uniform molded articles can be obtained when the produced pellets are molded by, for example, stretching, injection molding, non-stretching molding, extrusion molding (including profile extrusion molding), and blow molding. Uniformity of the pellets can be determined by molding the pellets into a sheet and measuring stretchability of the sheet. In other words, it can be considered that nonuniformly prepared pellets have substantial difficulty in the stretching of the molded sheet. In this specification, the term "uniform" means that a stretched part and an unstretched part do not exist together, and all parts are similarly stretched in stretching, for example.

Pellets

The pellets produced by the present invention are pellets formed from the resin composition including the crystalline macromolecule and the inorganic fine powder or the organic fine powder in a mass ratio of 50:50 to 20:80.

In the present invention, the crystalline macromolecule refers to a macromolecule having crystalline regions in which macromolecules are regularly arranged and amorphous regions in which macromolecules are irregularly arranged and has a melting point. The kind of the crystalline macromolecule is not particularly limited as long as the crystalline macromolecule has the crystalline regions. Examples of the crystalline macromolecule include polyolefin resins (for example, a polypropylene resin and a polyethylene resin), biodegradable resins, polyamide resins, polybutylene terephthalate (PBT), and polyethylene terephthalate (PET). Of these resins, the polyolefin resins and the biodegradable resins are preferable and the polypropylene resin and the polyethylene resin are particularly preferable. The polyolefin resin and the polyamide resin refer to a resin having polyolefin and polyamide as the main chain, respectively. More specifically, for example, the polypropylene resin refers to a resin having polypropylene as the main chain and these resins may be copolymers with other resins as long as they have crystallinity. For example, a propylene-ethylene copolymer may be used. The biodegradable resins refer to resins that are completely consumed by naturally occurring microorganisms and finally decomposed into water and carbon dioxide. Specific examples of the biodegradable resins include polylactic acid, polycaprolactone, polybutylene succinate, polybutylene adipate, polyethylene succinate, and cellulose esters. The crystalline macromolecules may be used singly or in combination of two or more of them. For example, the crystalline macromolecule may be a mixture of a polypropylene resin and a polyethylene resin.

Any constitutions of the resin composition forming the pellets according to the present invention may be applicable as long as the pellets are constituted of the crystalline macromolecule and the inorganic fine powder or the organic fine powder in a mass ratio of 50:50 to 20:80. For example, the pellets may be constituted by kneading the crystalline macromolecule and the inorganic fine powder or the organic fine powder so that the mass ratio is 50:50 to 20:80 in the kneading step in the present invention described below or may be constituted by previously preparing a resin composition including the crystalline macromolecule and the inorganic fine powder or the organic fine powder in a mass ratio of 50:50 to 20:80 and then using this resin composition in the kneading step described below.

The mass ratio of the crystalline macromolecule and the inorganic fine powder or the organic fine powder included in the resin composition in the present invention is not particularly limited as long as the mass ratio is in a ratio of 50:50 to 20:80. The mass ratio is preferably in a ratio of 48:52 to 30:70, more preferably in a ratio of 43:57 to 35:65, and further preferably in a ratio of 41:59 to 39:61.

The kind of the inorganic fine powder or the organic fine powder included in the resin composition in the present invention is not particularly limited. Examples of the inorganic fine powder include calcium carbonate, titanium oxide, silica, clay, talc, kaolin, aluminum hydroxide, calcium sulfate, barium sulfate, mica, zinc oxide, dolomite, glass fibers, and hollow glasses. The kind of the organic fine powder is not particularly limited. Examples of the organic fine powder include methyl cellulose, ethyl cellulose, polystyrene, polyacrylic acid esters, and polyvinyl acetate. Of these powders, calcium carbonate is preferably used as the inorganic fine powder. These fine powders may be used singly or in combination of two or more of them. In order to improve dispersibility of the inorganic fine powder in the resin composition, the surface of the inorganic fine powder may be previously modified in accordance with common methods.

The average particle diameter of the inorganic fine powder or organic fine powder included in the resin composition in the present invention is preferably 0.1 μm or larger and 50 μm or smaller and more preferably 1.0 μm or larger and 15 μm or smaller. The average particle diameter of the inorganic substance particles in the present invention is 50% particle diameter (d50) determined from a cumulative percent distribution curve measured by a laser diffraction type particle size distribution measuring apparatus. As the shape of the inorganic fine powder or the organic fine powder, any of a particle-like shape, a needle-like shape, and a flattened shape may be used.

The resin composition constituting the above-described pellets according to the present invention may include coloring agents, lubricating agents, coupling agents, fluidity improving materials, dispersing agents, antioxidants, ultraviolet ray absorbers, stabilizers, antistatic agents, and foaming agents as auxiliary agents in addition to the above-described crystalline macromolecule and inorganic fine powder or organic fine powder. These auxiliary agents may be added in the kneading step described below or may be previously added to the resin composition before the kneading step.

Examples of the lubricating agents may include fatty acid-based lubricating agents such as stearic acid, hydroxystearic acid, complex type stearic acid, and oleic acid, aliphatic amide-based lubricating agents such as stearamide, oxystearamide, oleylamide, erucylamide, ricinoleamide, behenamide, methylolamide, methylene-bisstearamide, methylene-bisstearobehenamide, bisamic acids of higher fatty acids, and complex type amides, aliphatic ester-based lubricating agents such as n-butyl stearate, methyl hydroxystearate, polyhydric alcohol fatty acid esters, saturated fatty acid esters, and ester type waxes, and fatty acid metal soap-based lubricants.

As the antioxidants, phosphorus-based antioxidants, phenol-based antioxidants, and pentaerythritol-based antioxidants can be used. The phosphorus-based antioxidant, more specifically, phosphorus-based antioxidant stabilizer such as phosphite esters and phosphate esters are preferably used. Examples of the phosphite esters may include triesters, diesters, and monoesters of phosphorous acid such as triphenyl phosphite, trisnonylphenyl phosphite, and tris(2,4-di-tert-butylphenyl)phosphite.

Examples of the phosphate esters may include trimethyl phosphate, triethyl phosphate, tributyl phosphate, trioctyl phosphate, triphenyl phosphate, tricresyl phosphate, tris (nonylphenyl) phosphate, and 2-ethylphenyldiphenyl phosphate. These phosphorus-based antioxidants may be used singly or in combination of two or more of them.

Examples of the phenol-based antioxidants may include α-tocopherol, butylhydroxytoluene, sinapyl alcohol, vitamin E, n-octadecyl-3-(3,5-di-tert-butyl-4-hydroxyphenyl) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, and tetrakis[3-(3,5-di-tert-butyl-4-hydroxyphenyl)propionyloxymethyl] methane. These phenol-based antioxidants may be used singly or in combination of two or more of them.

The shape of the pellets to be produced in the present invention is not particularly limited. For example, pellets having shapes such as a cylinder, a sphere, and an oval sphere may be molded. The size of the pellets may be appropriately determined according to the shape. For example, in the case of the spherical pellets, the size may be 1 mm to 10 mm in diameter. In the case of the oval spherical pellets, the pellets may have an oval shape with an aspect ratio of 0.1 to 1.0 and the length of the major axis and minor axis of the pellets may be 1 mm to 10 mm. In the case of the cylindrical pellets, the size may be in the range of 1 mm to 10 mm in diameter and in the range of 1 mm to 10 mm in length. These shapes may be provided to the pellets during molding after the kneading step described below. The shape of the pellets may be provided by molding in accordance with common methods.

Kneading Step

The present invention includes the method including the step of kneading the crystalline macromolecule and the inorganic fine powder or the organic fine powder so that the microcrystalline size of the crystalline macromolecule is 190 Å or smaller.

In the kneading step according to the present invention, the pellets can be kneaded at a temperature at which the microcrystalline size of the crystalline macromolecule in the pellets can be sufficiently small (for example, 190 Å or smaller as described below) even when the temperature is lower than the usual kneading temperature. The molded article may be uniformly molded (for example, stretched) from the pellets including the crystalline macromolecule having small microcrystalline size even at such a temperature.

The kneading step is not particularly limited as long as the microcrystalline size of the crystalline macromolecule is 190 Å or smaller. The microcrystalline size is preferably 185 Å or smaller, more preferably 180 Å or smaller, further preferably 175 Å or smaller, still more preferably 170 Å or smaller, further more preferably 165 Å or smaller, and still further more preferably 160 Å or smaller. The lower limit of the microcrystalline size of the crystalline macromolecule in the kneading step may be 50 Å or larger (75 Å or larger, 100 Å or larger, 125 Å or larger, or 150 Å or larger).

The kneading temperature can be specified by determining the microcrystalline size of the crystalline macromolecule by the method described later. For example, the pellets may be kneaded at a temperature equal to or higher than the temperature at which the microcrystalline size of the crystalline macromolecule is 190 Å (for example, a temperature at least 45° C. higher than the melting point of the crystalline macromolecule or at least 55° C. higher than the melting point of the crystalline macromolecule).

The kneading temperature can be controlled by changing the setting temperature of a kneading apparatus. As the apparatus used for kneading, conventionally known apparatuses used for kneading pellets may be used. Examples of the apparatus may include single screw or twin screw kneading extruders (for example, a co-rotating twin screw kneading extruder HK-25D, manufactured by Parker corporation, Inc. and an HTM type special twin screw extruder for compounding, manufactured by CTE Co., Ltd.) and a Banbury mixer (for example, a 75-liter 3D Banbury mixer, manufactured by Kobe Steel, Ltd.).

As a time for kneading, the kneading may be carried out until the microcrystalline size of the crystalline macromolecule becomes sufficiently small. For example, the time of kneading may be determined after confirming that the microcrystalline size of the crystalline macromolecule is 190 Å or smaller.

Method for Producing Resin Molded Article

The present invention further includes a method for producing a resin molded article, the method including the steps of: producing the pellets by the above-described method, and molding the pellets into a resin molded article.

In the method for producing the resin molded article according to the present invention, in the step of molding the pellets into a resin molded article, the method for molding the pellets into a resin molded article is not particularly limited. For example, injection molding, non-stretching molding, extrusion molding (for example, T-die extrusion molding and profile extrusion molding), blow molding, and stretching may be carried out. The method preferably includes a step of stretching. The pellets including the crystalline macromolecule having the small microcrystalline size tend to provide the uniform resin molded article when the pellets are molded.

Pellets

The present invention includes pellets formed from a resin composition including a crystalline macromolecule having a microcrystalline size of 190 Å or smaller, and inorganic fine powder or organic fine powder in a mass ratio of 50:50 to 20:80. Such pellets can be produced by the above-described method for producing the pellets according to the present invention.

The microcrystalline size of the crystalline macromolecule included in the pellets is not particularly limited as long as the microcrystalline size is 190 Å or smaller. The microcrystalline size is preferably 185 Å or smaller, more preferably 180 Å or smaller, further preferably 175 Å or smaller, still more preferably 170 Å or smaller, further more preferably 165 Å or smaller, and still further more preferably 160 Å or smaller. The lower limit of the microcrystalline size of the crystalline macromolecule included in the pellets may be 50 Å or larger (75 Å or larger, 100 Å or larger, 125 Å or larger, or 150 Å or larger).

In the present invention, the microcrystalline size is determined by measuring the wide angle X-ray diffraction of the crystalline macromolecule included in the pellets and calculating the size from the half peak width of the diffraction peak of the (040) plane of the resin crystal (α crystal) defined by G. Natta et al. from the obtained diffraction pattern. Specifically, a base line excluding amorphous components of the resin (for example, a polypropylene resin) is prepared from the diffraction pattern obtained by the wide angle X-ray diffraction measurement in accordance with drawing procedure by G. Natta (refer to A. Weidinger and P. H. Hermans, Die Makromolekulare Chemie, 98-115, 50 (1961)). Thereafter, the half peak width is determined from the diffraction peak corresponding to the (040) plane of the α crystal of the resin defined by G. Natta et al. The half peak width is substituted into Scherrer's equation below to calculate the microcrystalline size.

$$D = (K\lambda) / \{(B-b)\cos\theta\} \quad \text{(Scherrer's equation)}$$

D: Microcrystalline size (Å)
K: Scherrer's constant=0.9λ: wavelength of Kα line of Cu=1.5405 (Å)
θ: Diffraction peak angle (rad)
B: Half peak width (rad)
b: Half peak width of diffraction peak of infinite crystal (rad)

The infinite crystal ideally has a half peak width of 0. However, the peak width can be nonzero depending on the accuracy of the apparatus, and thus b is used as a correction term of the apparatus accuracy. As the infinite crystal, powder silicon (#200 mesh, manufactured by Mitsuwa Chemicals Co., Ltd.) is used.

The crystalline macromolecule included in the pellets according to the present invention is not particularly limited as long as the microcrystalline size is 190 Å or smaller. In particular, a polypropylene resin is preferable because the uniformity of the resin molded article is excellent when the microcrystalline size is 190 Å or smaller.

Pellets according to the present invention are mainly used for resin molding. The kind of the molding (for example, injection molding, unstretched molding, extrusion molding (including profile extrusion molding), blow molding, or stretching) is not particularly limited. The pellets are suitable for stretching and thus are preferably used for stretching.

EXAMPLE

Production of Pellets and Stretching of Sheets

In Examples 1 and 2 and Comparative Examples 1 and 2 described below, pellets are produced and stretched to evaluate uniformity at the time of stretching. As the polypropylene resin, a polypropylene homopolymer PP1 (EA9 (melting point 165 ° C.), manufactured by Japan Polypropylene Corporation) was used. As calcium carbonate, CC1 (Lighton S-4, average particle diameter 2.2 μm) was used. As the lubricating agent, magnesium stearate (MS1) was used. Using a co-rotating twin screw kneading extruder HK-25D (screw diameter 25 mm, L/D=41) manufactured by Parker corporation, Inc., the PP1 resin, CC1, and MS1 were charged with a loss-in weight type vibration feeder from uppermost stream. Strands were extruded and the extruded strands were cut after cooling to form pellets. The cylinder temperatures from the upstream to the downstream were set to 195° C. (Comparative Example 1), 205° C. (Comparative Example 2), 210° C. (Example 3), 230° C. (Example 2), and 220° C. (Example 1). Thus prepared pellets were extruded with a LABO PLASTOMILL single screw T-die extrusion molding apparatus manufactured by Toyo Seiki Seisaku-sho, Ltd. (screw diameter 20 mm, L/D=25) at 195° C. to mold a sheet. These sheets were simultaneously biaxially stretched at 125° C. at 2 times×2 times in the longitudinal and transverse directions at 7 mm/minute using a biaxial stretcher IMC-11A9 manufactured by IMOTO MACHINERY CO., LTD. Hereinafter, the production methods and other conditions of Examples 1 and 2 and Comparative Examples 1 and 2 each will be described.

Example 1

Pellets were prepared in a ratio of PP1/CC1/MS1=40/60/0.5 by setting the cylinder temperatures from the upstream to downstream at 220° C. The pellets were frozen and pulverized. The wide-angle X-ray diffraction pattern of the obtained powder was observed with Ultima IV X-ray diffraction apparatus manufactured by Rigaku Corporation and the diffraction pattern originating from α-phase of isotactic polypropylene was obtained. The microcrystalline size calculated from the half peak width of the diffraction peak of the (040) plane of the α-phase was 158 Å. The pellets were used to mold the sheet at 195° C. The obtained sheet was simultaneously biaxially stretched at 125° C. at 2 times×2 times in the longitudinal and transverse directions. The sheet was capable of being uniformly stretched and a uniform white sheet was capable of being prepared.

Example 2

Pellets were prepared in a ratio of PP1/CC1/MS1=40/60/0.5 by setting the cylinder temperatures from the upstream to downstream at 230° C. The pellets were frozen and pulverized. The wide-angle X-ray diffraction pattern of the obtained powder was observed with Ultima IV X-ray diffraction apparatus manufactured by Rigaku Corporation and the diffraction pattern originating from α-phase of isotactic polypropylene was obtained. The microcrystalline size calculated from the half peak width of the diffraction peak of the (040) plane of the α-phase was 161 Å. The pellets were used to mold the sheet at 195° C. The obtained sheet was simultaneously biaxially stretched at 125° C. at 2 times×2 times in the longitudinal and transverse directions. The sheet was capable of being uniformly stretched and a uniform white sheet was capable of being prepared.

Example 3

Pellets were prepared in a ratio of PP1/CC1/MS1=40/60/0.5 by setting the cylinder temperatures from the upstream to downstream at 210° C. The pellets were frozen and pulverized. The wide-angle X-ray diffraction pattern of the obtained powder was originating with Ultima IV X-ray diffraction apparatus manufactured by Rigaku Corporation and the diffraction pattern originating from α-phase of isotactic polypropylene was obtained. The microcrystalline size calculated from the half peak width of the diffraction peak of the (040) plane of the α-phase was 181 Å. The pellets were used to mold the sheet at 195° C. The obtained sheet was simultaneously biaxially stretched at 125° C. at 2 times×2 times in the longitudinal and transverse directions. The sheet was capable of being substantially uniformly stretched and a degree of whiteness increased. However, the sheet in Example 1 indicated less unevenness in the stretching than that of the sheet in Example 3.

Comparative Example 1

Pellets were prepared in a ratio of PP1/CC1/MS1=40/60/0.5 by setting the cylinder temperatures from the upstream to downstream at 195° C. The pellets were frozen and pulverized. The wide-angle X-ray diffraction pattern of the obtained powder was observed with Ultima IV X-ray diffraction apparatus manufactured by Rigaku Corporation and the diffraction pattern originating from both of α-phase and β-phase of isotactic polypropylene was obtained. The microcrystalline size calculated from the half peak width of the diffraction peak of the (040) plane of the α-phase was 197 Å. The pellets were used to mold the sheet at 195° C. The obtained sheet was simultaneously biaxially stretched at 125° C. at 2 times×2 times in the longitudinal and transverse directions. The stretching was non-uniform. The part not stretched remained transparent whereas the stretched part turned into white.

Comparative Example 2

Pellets were prepared in a ratio of PP1/CC1/MS1=40/60/0.5 by setting the cylinder temperatures from the upstream to downstream at 205° C. The pellets were frozen and pulverized. The wide-angle X-ray diffraction pattern of the obtained powder was observed with Ultima IV X-ray diffraction apparatus manufactured by Rigaku Corporation and the diffraction pattern originating from α-phase of isotactic polypropylene was obtained. The microcrystalline size calculated from the half peak width of the diffraction peak of the (040) plane of the α-phase was 193 Å. The pellets were used to mold the sheet at 195° C. The obtained sheet was simultaneously biaxially stretched at 125° C. at 2 times×2 times in the longitudinal and transverse directions. The stretching was non-uniform. The part not stretched remained transparent whereas the stretched part turned into white.

In Table 1, the evaluation results of the microcrystalline size of the pellets produced by the methods in Examples 1, 2, and 3 and Comparative Examples 1 and 2 and uniformity after stretching sheets formed of the respective pellets are listed. In Table 1, "◎" indicates remarkably excellent uniformity, "○" excellent uniformity, and "x" poor uniformity.

TABLE 1

|  | Cylinder temperature | Microcrystalline size (Å) | Uniformity after stretching |
|---|---|---|---|
| Example 1 | 220° C. | 158 | ◎ |
| Example 2 | 230° C. | 161 | ◎ |
| Example 3 | 210° C. | 181 | ○ |
| Comparative Example 1 | 195° C. | 197 | X |
| Comparative Example 2 | 205° C. | 193 | X |

In Examples, uniform stretching is possible in Example 3, in which the microcrystalline size is 181 Å and uniform stretchability is further improved in Examples 1 and 2, in which the microcrystalline sizes are 158 Å and 161 Å, respectively.

The invention claimed is:

1. A method for producing pellets formed from a resin composition including a crystalline macromolecule and an inorganic fine powder in a mass ratio of 50:50 to 20:80, the method comprising the step of:

kneading the crystalline macromolecule and the inorganic fine powder at a temperature that is at least 45° C. higher than a melting point of the crystalline macromolecule so that the crystalline macromolecule has a microcrystalline size of 190 Å or smaller, wherein an average particle diameter of the inorganic fine powder is 50 μm or smaller.

2. The method according to claim 1, wherein the crystalline macromolecule includes a polypropylene resin or a polyethylene resin.

3. The method according to claim 1, wherein the inorganic fine powder includes calcium carbonate particles.

4. The method according to claim 1, wherein the pellets are molded by the kneading at the temperature equal to or higher than a temperature at which the microcrystalline size of the crystalline macromolecule is 190 Å or smaller.

5. A method for producing a resin molded article, the method comprising steps of:

producing the pellets by the method for producing pellets according to claim 1; and molding the pellets into the resin molded article.

* * * * *